UNITED STATES PATENT OFFICE.

ERNST WINTER, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

RED COTTON-DYE AND PROCESS OF MAKING SAME.

SPECIFICATION forming part of Letters Patent No. 697,765, dated April 15, 1902.

Application filed August 3, 1901. Serial No. 70,752. (Specimens.)

*To all whom it may concern:*

Be it known that I, ERNST WINTER, Ph. D., a citizen of the Empire of Germany, residing at Höchst-on-the-Main, in the Empire of Germany, have invented certain new and useful Improvements in the Manufacture of Red Cotton-Dyes and Processes of Making the Same, of which the following is a specification.

I have found a process to manufacture new dyestuffs. As raw material the asymmetric thio-ureas are used, which are obtained by the action of aromatic mustard-oils on 2.5.7-amidonaphtholsulfonic acid and which have the formula:

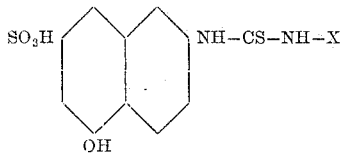

In this formula X means the radical of an amin of the benzene series. By combining these asymmetric thio-ureas with diazo compounds the new dyestuffs are obtained, which from their construction have the following formula:

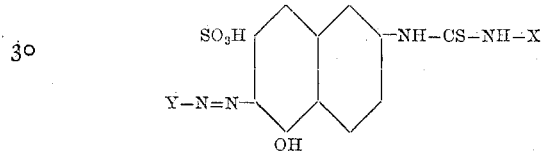

wherein X means the radical of an amin of the benzene series, Y the radical of a diazo compound, for instance, of anilin, of its homologues, of anisidin, of para-amidoacetanilid.

The new dyestuffs are brown-red powders, soluble in water to a red solution, directly dyeing cotton red shades, the dyeings being characterized by their fastness to acids.

I illustrate my process by the following example: 37.9 kilos of thio-urea, obtained from 2.5.7-amidonaphtholsulfonic acid and phenyl-mustard oil, are dissolved in water, to which are added twenty kilos of sodium carbonate, whereupon a diazo solution is gradually run in, which is prepared in the usual manner from fifteen kilos of para-amidoacetanilid, twenty-five kilos of hydrochloric acid, and 6.9 kilos of nitrite. The dyestuff is formed at once and partly separates from the solution. On addition of common salt a complete separation is produced, and the dyestuff is obtained by filtration and drying as a red powder of green luster, which is soluble in water to a red solution, dyeing unmordanted cotton red. The aqueous solution becomes blue-red on addition of mineral acid and yellow-red on adding alkali. The dyestuff is little soluble in alcohol and insoluble in petroleum ether. Concentrated sulfuric acid dissolves the dyestuff with a blue-red color.

Having now described my invention, what I claim is—

1. The herein-described process for the manufacture of dyestuffs for cotton, which consists in combining asymmetric thio-ureas, obtained by the action of aromatic mustard-oils on 2.5.7-amidonaphtholsulfonic acid with diazo compounds, substantially as set forth.

2. The herein-described process for the manufacture of a dyestuff for cotton, which consists in combining asymmetric thio-ureas obtained by the combination of an aromatic mustard-oil with 2.5.7-amidonaphtholsulfonic acid with the diazo compound of para-amidoacetanilid, substantially as set forth.

3. As new products, the dyestuffs having the general formula:

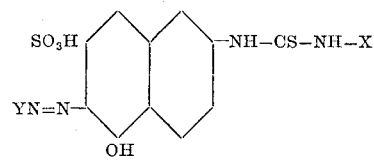

wherein Y is the radical of a diazo compound, X the radical of an amin of the benzene series, being brown-red powders soluble in water and which directly dye cotton red shades fast to acids.

4. As a new product, the dyestuff obtained by the action of diazotized para-amidoacet-anilid on thio-ureas of the formula:

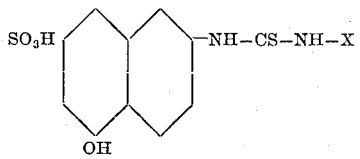

wherein X means the radical of an amin of the benzene series, being a brown-red powder of metallic luster soluble in water to a red solution becoming blue-red on addition of mineral acid, and yellow-red on adding alkali; little soluble in alcohol; insoluble in petroleum ether; soluble in concentrated sulfuric acid, with a blue-red color; and which directly dyes cotton blue-red shades fast to acids.

In testimony that I claim the foregoing as my invention I have signed my name in presence of two subscribing witnesses.

ERNST WINTER.

Witnesses:
 ALFRED BRISBOIS,
 HEINRICH HAHN.